(12) United States Patent
Alexander et al.

(10) Patent No.: US 8,337,579 B2
(45) Date of Patent: Dec. 25, 2012

(54) AIR CLEANER ASSEMBLIES AND VEHICLES INCLUDING SAME

(75) Inventors: Matthew J. Alexander, Hilliard, OH (US); Kelly Ann Longwell, Denver, CO (US)

(73) Assignee: Honda Motor Company, Ltd., Tokyo (JP)

( * ) Notice: Subject to any disclaimer, the term of this patent is extended or adjusted under 35 U.S.C. 154(b) by 163 days.

(21) Appl. No.: 12/942,065

(22) Filed: Nov. 9, 2010

(65) Prior Publication Data

US 2012/0110964 A1    May 10, 2012

(51) Int. Cl.
 *B01D 46/00* (2006.01)
(52) U.S. Cl. ............. 55/385.3; 55/498; 55/503; 55/504; 55/505; 123/198 E
(58) Field of Classification Search .......... 55/385.3, 55/DIG. 30; 95/273, 278; 96/420, 417, 421; 60/311, 295, 297, 300; 123/198 E, 585; 137/625.31, 137/599, 115.13; 251/61.2, 63, 63.6, 249.5, 251/318
See application file for complete search history.

(56) References Cited

U.S. PATENT DOCUMENTS

| | | | |
|---|---|---|---|
| 3,095,290 A | 6/1963 | Hockett | |
| 4,425,145 A * | 1/1984 | Reese | 55/385.3 |
| 5,213,596 A | 5/1993 | Kume et al. | |
| 5,391,212 A * | 2/1995 | Ernst et al. | 55/385.3 |
| 6,149,700 A * | 11/2000 | Morgan et al. | 55/385.3 |
| 6,162,271 A | 12/2000 | Bullinger et al. | |
| 6,231,630 B1 | 5/2001 | Ernst et al. | |
| 6,287,354 B1 | 9/2001 | Nozaki | |
| 6,312,491 B2 | 11/2001 | Coulonvaux | |
| 6,866,694 B2 * | 3/2005 | Moreau et al. | 55/385.3 |
| 7,353,902 B2 | 4/2008 | Noda | |
| 7,361,201 B2 * | 4/2008 | Nakagome et al. | 55/385.3 |
| 7,686,873 B2 * | 3/2010 | Kawatani | 96/420 |
| 2002/0020156 A1 * | 2/2002 | Goerg | 55/385.3 |
| 2002/0069625 A1 * | 6/2002 | Stass | 55/385.3 |
| 2003/0051453 A1 * | 3/2003 | Moreau et al. | 55/385.3 |
| 2009/0266060 A1 * | 10/2009 | Guo et al. | 60/295 |

* cited by examiner

*Primary Examiner* — Duane Smith
*Assistant Examiner* — Minh-Chau Pham
(74) *Attorney, Agent, or Firm* — Ulmer & Berne LLP

(57) ABSTRACT

An air cleaner assembly includes an air box and an air filter. The air box includes a body and a lid. The body includes a lower rib member coupled with at least one of a wall and a floor. The lid is movable to a closed position and includes an upper rib member that includes shoulder and arm portions. The air filter element includes a first end and defines outer and first end surfaces. The shoulder and arm portions define respective shoulder and arm surfaces. When the lid is in the closed position, the first end is sandwiched between the upper and lower rib members, the outer surface contacts each of the rest and shoulder surfaces, the first end surface contacts the arm surface, and the air filter element is positioned between and spaced from each of the floor surface and the lid surface.

21 Claims, 7 Drawing Sheets

AIR CLEANER ASSEMBLIES AND VEHICLES INCLUDING SAME

TECHNICAL FIELD

Vehicles are provided which include an air cleaner assembly. The air cleaner assembly includes an air box that supports an air filter element.

BACKGROUND

Some conventional air cleaner assemblies include an air box that is fluidly coupled with an engine. An air filter element is provided within the air box. Ambient air is provided into the air box, filtered by the air filter element, and introduced into the engine. The air filter element is supported within the air box by a support arrangement.

SUMMARY

In accordance with one embodiment, an air cleaner assembly comprises an air box and an air filter. The air box comprises a body and a lid. The body comprises a floor, a wall, and a lower rib member. The floor defines a floor surface. The wall extends from the floor and cooperates with the floor to at least partially define a receptacle. The lower rib member defines a rest surface and is coupled with at least one of the wall and the floor. The lid is associated with the body and is movable between an opened position and a closed position. The lid comprises a cover member and an upper rib member. The upper rib member comprises a shoulder portion and an arm portion. The air filter element is at least partially disposed within the receptacle. The air filter element comprises a first end and a second end and defines an outer surface and a first end surface. The first end surface is adjacent to the first end of the air filter element. The cover member of the lid defines a lid surface. The shoulder portion of the upper rib member defines a shoulder surface. The arm portion of the upper rib member defines an arm surface. When the lid is in the closed position, the lid at least partially covers the receptacle, the first end of the air filter element is sandwiched between the upper rib member and the lower rib member, the outer surface of the air filter element contacts each of the rest surface and the shoulder surface, the first end surface of the air filter element contacts the aim surface, and the air filter element is positioned between and spaced from each of the floor surface and the lid surface.

In accordance with another embodiment, a vehicle comprises a frame, an engine, and an air cleaner assembly. The engine is supported with respect to the frame. The air cleaner assembly is supported with respect to the frame and comprises an air duct, an air box, and an air filter element. The air duct is fluidly coupled with the engine. The air box comprises a body and a lid. The body comprises a floor, a wall, and a lower rib member. The floor defines a floor surface. The wall extends from the floor and cooperates with the floor to at least partially define a receptacle. The lower rib member defines a rest surface and is coupled with at least one of the wall and the floor. The lid is associated with the body and is movable between an opened position and a closed position. The lid comprises a cover member and an upper rib member. The upper rib member comprises a shoulder portion and an arm portion. The air filter element is at least partially disposed within the receptacle and is fluidly coupled with the air duct. The air filter element comprises a first end and a second end and defines an outer surface and a first end surface. The first end surface is adjacent to the first end of the air filter element. The cover member of the lid defines a lid surface. The shoulder portion of the upper rib member defines a shoulder surface. The arm portion of the upper rib member defines an arm surface. When the lid is in the closed position, the lid at least partially covers the receptacle, the first end of the air filter element is sandwiched between the upper rib member and the lower rib member, the outer surface of the air filter element contacts each of the rest surface and the shoulder surface, the first end surface of the air filter element contacts the arm surface, and the air filter element is positioned between and spaced from each of the floor surface and the lid surface.

In accordance with yet another embodiment, an air cleaner assembly comprises an air box and an air filter element. The air box comprises a body and a lid. The body comprises a floor, a wall, and a lower rib member. The floor defines a floor surface. The wall extends from the floor and cooperates with the floor to at least partially define a receptacle. The wall defines a passageway. The lower rib member defines a rest surface and is coupled with at least one of the wall and the floor. The lid is associated with the body and is movable between an opened position and a closed position. The lid comprises a cover member and an upper rib member. The upper rib member comprises a shoulder portion and an arm portion. The air filter element is at least partially disposed within the receptacle and comprises a first end and a second end. The air filter element comprises an inner filter and an outer filter. The inner filter defines a first end surface and the outer filter defines a substantially cylindrical outer surface. The first end surface is adjacent to the first end of the air filter element and the second end is in fluid communication with the passageway. The cover member of the lid defines a lid surface. The shoulder portion of the upper rib member defines a shoulder surface. The aim portion of the upper rib member defines an arm surface. When the lid is in the closed position, the lid at least partially covers the receptacle, the first end of the air filter element is sandwiched between the upper rib member and the lower rib member, the outer surface of the outer filter contacts each of the rest surface and the shoulder surface, the arm portion of the upper rib member extends beyond the outer filter such that the arm surface contacts the first end surface of the inner filter, and the outer surface of the outer filter is completely spaced from the floor surface and the lid surface.

BRIEF DESCRIPTION OF THE DRAWINGS

Various embodiments will become better understood with regard to the following description, appended claims, and accompanying drawings wherein:

DETAILED DESCRIPTION

Figure 1:
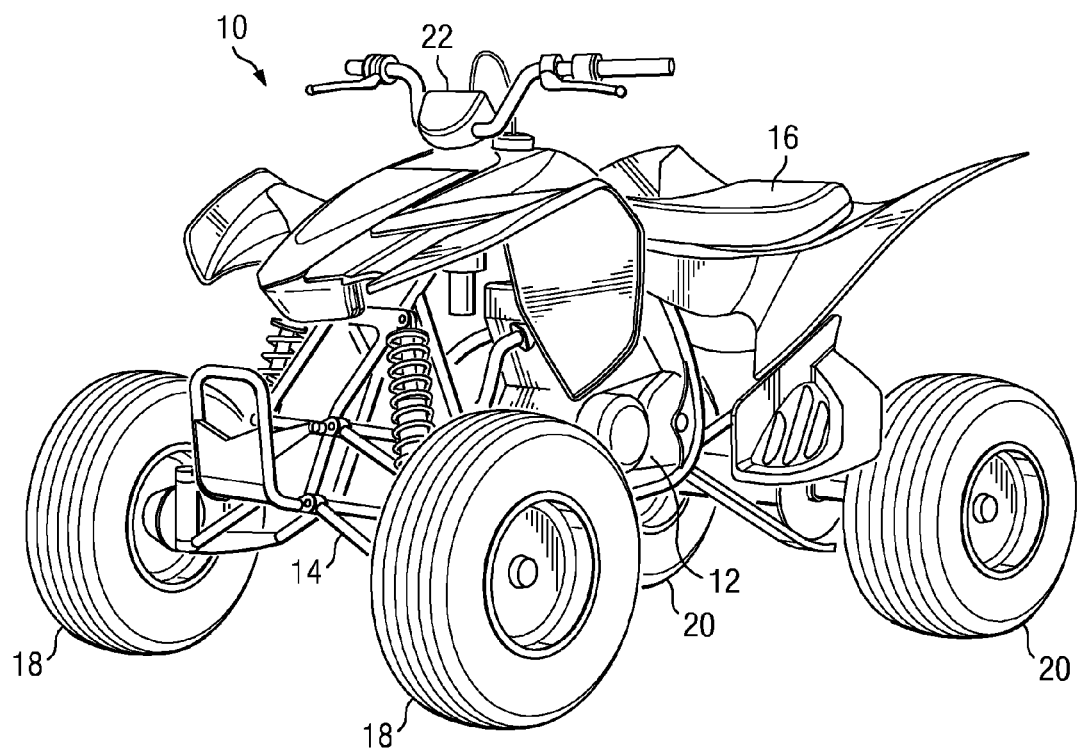
FIG. 1 is a front perspective view depicting a vehicle in accordance with one embodiment.

In connection with the views and examples of FIGS. 1-8, wherein like numbers indicate the same or corresponding elements throughout the views, FIG. 1 illustrates a vehicle 10. The vehicle 10 is shown to comprise an all-terrain vehicle ("ATV"). However, in other embodiments, any of a variety of other saddle-type vehicles, such as motorcycles, or other vehicles, such as automobiles can be provided. As illustrated in FIG. 1, the vehicle 10 can include an engine 12 and a frame 14. The engine 12 can be supported by or otherwise with respect to the frame 14. A seat 16 can be coupled with the frame 14 and positioned rearwardly of the engine 12. The frame 14 can rotatably support a pair of front wheels 18 and a pair of rear wheels 20. The front wheels 18 can be coupled with handlebars 22 to facilitate steering of the front wheels 18 by an operator. A drivetrain (not shown) can couple the engine 12 with some or all of the wheels (e.g., 18, 20) such that the engine 12 can transmit motive power to the wheel(s) (e.g., 18, 20) to operate the vehicle 10.

Figure 2:
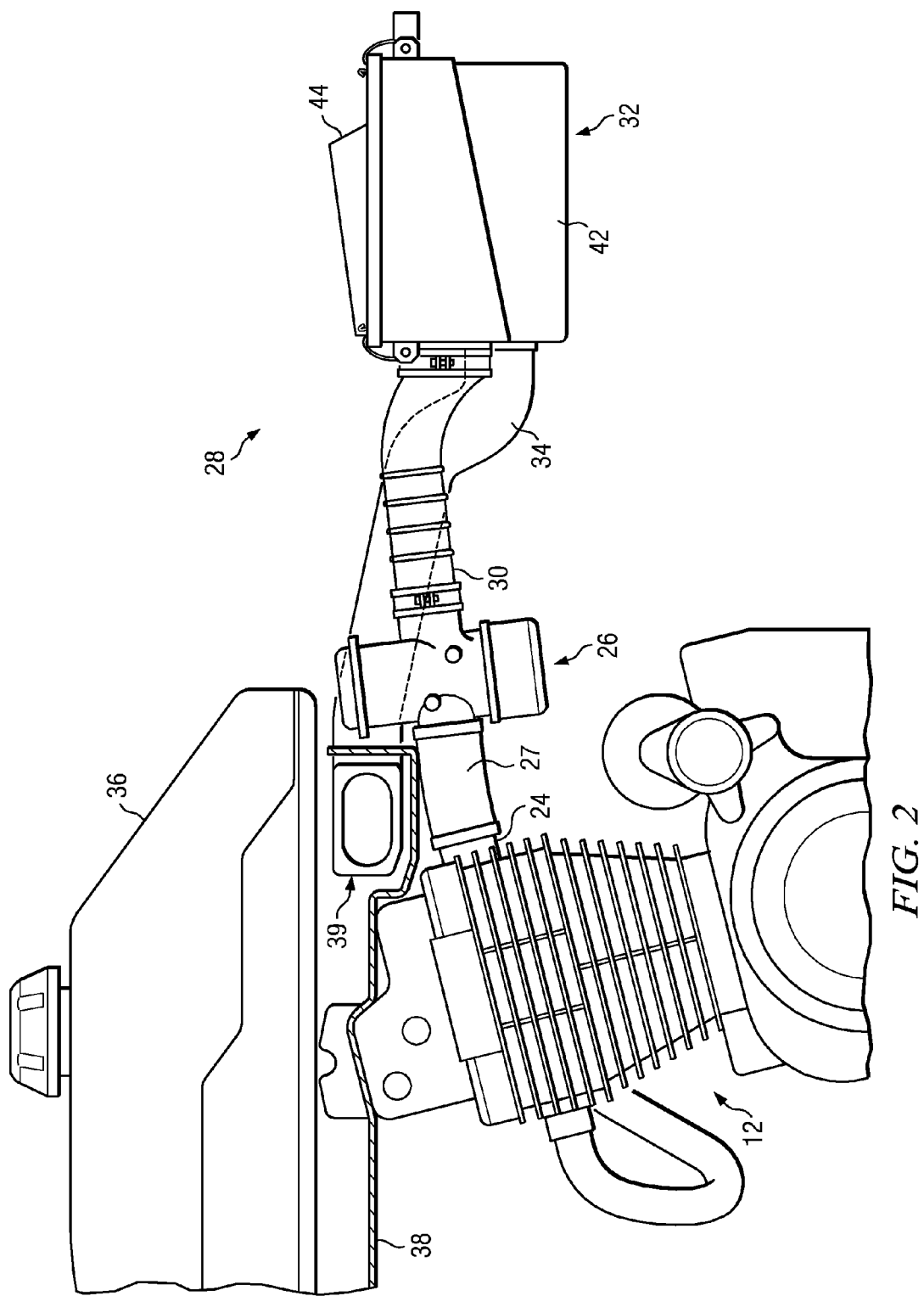
FIG. 2 is a left side elevational view depicting an engine, an air cleaner assembly, a fuel tank, and other various vehicular components of the vehicle of FIG. 1.

As illustrated in FIG. 2, the engine 12 can include an intake port 24 that is fluidly coupled with a carburetor 26 by way of a carburetor duct 27. The carburetor 26 can be fluidly coupled with a fuel source (e.g., fuel tank 36) and can be configured to selectively introduce fuel (e.g., gasoline) from the fuel source into the intake port 24. The carburetor 26 can also be fluidly coupled with an air cleaner assembly 28. The carburetor 26 can introduce ambient air from the air cleaner assembly 28 into the intake port 24 of the engine 12 simultaneously with the fuel from the fuel source to facilitate ignition of the fuel by the engine 12 (e.g., with a spark plug). It will be appreciated that in one embodiment, the carburetor 26 can include any of a variety of components that can facilitate the introduction of fuel and ambient air into the engine 12, such as a float valve, a jet, a throttle valve, and a choke valve, for example. It will be appreciated, however, that a carburetor can be provided in any of a variety of suitable alternative arrangements for introducing fuel and/or air into an engine. It will also be appreciated that any of a variety of suitable alternative fuel delivery systems (e.g., an electronic fuel injection system) can be associated with an engine to facilitate the introduction of fuel and ambient air into an engine. Although the engine 12 is illustrated as a gasoline-type internal combustion engine, any of a variety of suitable alternative internal combustion or other air-fed-type engines can alternatively be provided upon the vehicle 10.

Figure 3:
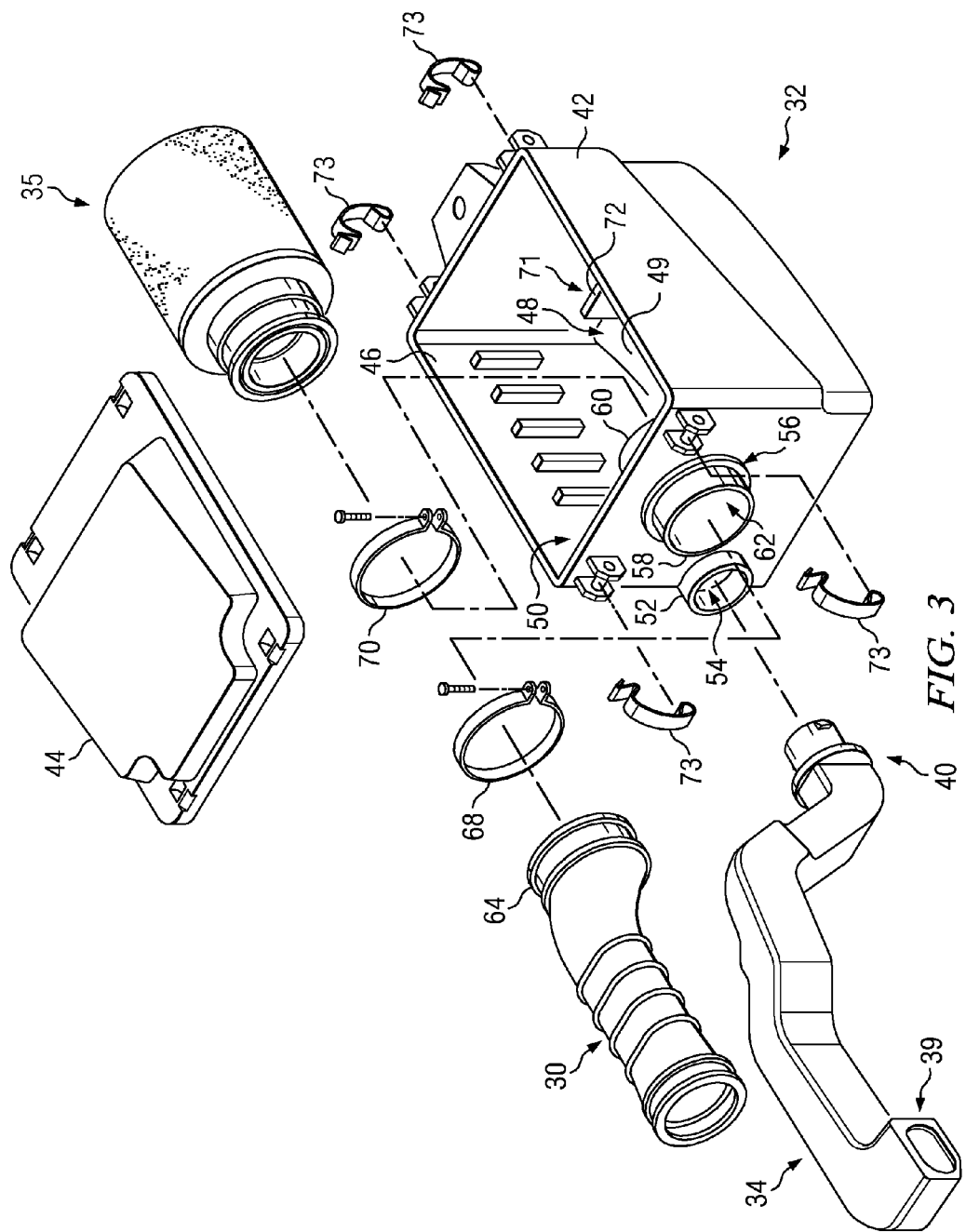
FIG. 3 is an exploded top perspective view depicting a body, a lid, a snorkel, an air duct, an air filter element, and various other components of the air cleaner assembly of FIG. 2.

As illustrated in FIGS. 2 and 3, the air cleaner assembly 28 can include an intake duct 30, an air box 32, a snorkel 34, and an air filter element 35. The intake duct 30 and the snorkel 34 can be in fluid communication with the air box 32. The air filter element 35 can be disposed within the air box 32 and in fluid communication with the intake duct 30. During operation of the engine 12, ambient air can be drawn into the air box 32 via the snorkel 34. The ambient air can be filtered by the air filter element 35 and then provided into the carburetor 26 by way of the intake duct 30.

As illustrated in FIG. 2, a fuel tank 36 can be provided above the engine 12. In order to limit heat transfer from the engine 12 to the fuel tank 36, a heat shield 38 can be interposed between the engine 12 and the fuel tank 36. The snorkel 30 can be routed between the heat shield 38 and the fuel tank 36 such that ambient air provided between the fuel tank 36 and the heat shield 38 can be introduced into a proximal end 39 of the snorkel 30. In this manner, air directly heated by the engine 12 can be prevented from being introduced into the proximal end 39 of the snorkel 30.

The air box 32 can include a body 42 and a lid 44. As illustrated in FIG. 3, the body 42 can include a wall 46 and a floor 48. The floor 48 can define a floor surface 49 and can cooperate with the wall 46 to at least partially define a receptacle 50. As illustrated in FIG. 3, the wall 46 can define a snorkel port 52 at one end of the body 42. The snorkel port 52 can define a first passageway 54 that extends into the receptacle 50. A distal end 40 of the snorkel 34 can be coupled with the snorkel port 52, as generally illustrated in FIG. 3, to facilitate fluid communication between the snorkel 34 and the air box 32. In one embodiment, as illustrated in FIG. 3, the distal end 40 of the snorkel 34 can be coupled with the snorkel port 52 through use of an interference-type fit. However, in other embodiments, the distal end 40 of the snorkel 34 can be selectively fluidly coupled with the snorkel port 52 with a clamp or other suitable alternative coupling arrangement. It will be appreciated that in still other embodiments, the distal end 40 of the snorkel 34 can be coupled with the snorkel port 52 in any of a variety of suitable alternative arrangements such as with adhesive or by integrally forming a snorkel and a body as a one-piece construction, for example.

Figure 4:
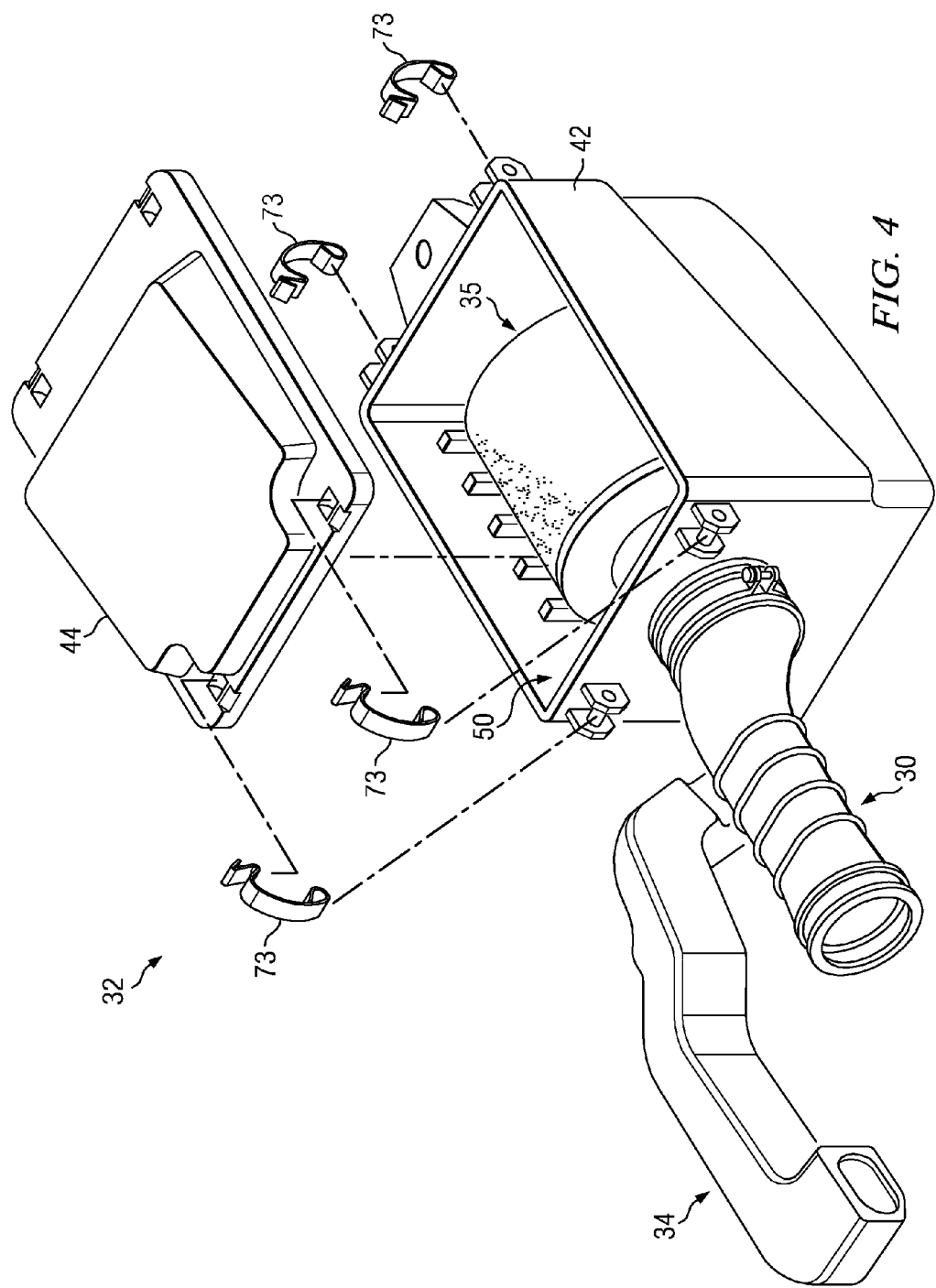
FIG. 4 is a partially exploded top perspective view depicting the air cleaner assembly of FIG. 2 with the lid in an opened position and with retention clips removed.
Figure 7:
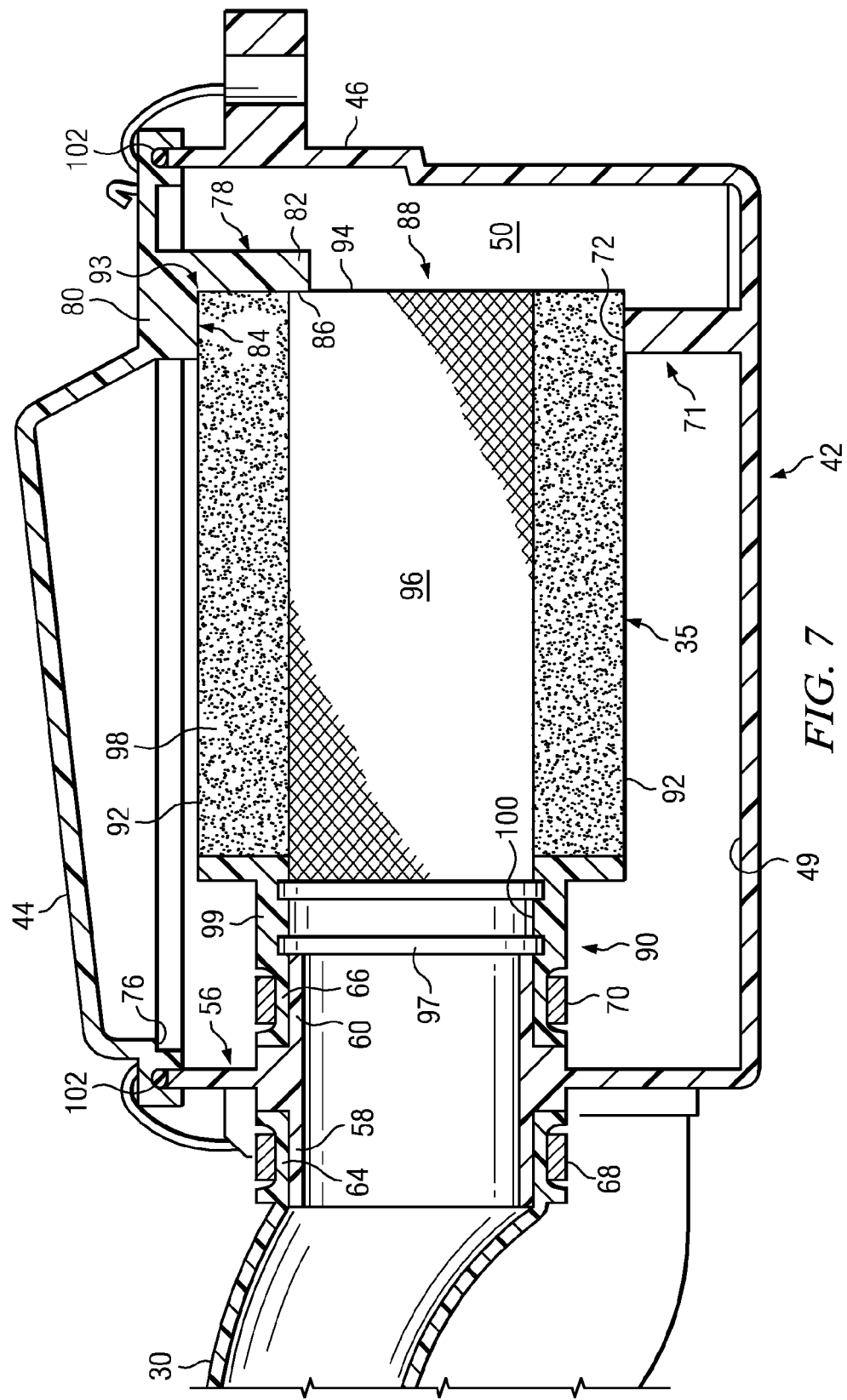
FIG. 7 is a cross-sectional view taken along section lines 7-7 in FIG. 5.

The air box 32 can include a coupling 56 that facilitates fluid coupling between the air duct 30 and the air filter element 35. In one embodiment, as illustrated in FIG. 3, the coupling 56 can comprise a two-sided coupling that includes a first flanged end 58 and a second flanged end 60. The coupling 56 can extend through the wall 46 adjacent to the snorkel port 52 such that the coupling 56 defines a passageway 62 that extends into the receptacle 50. The first flanged end 58 can be coupled with the intake duct 30, as illustrated in FIG. 4, to facilitate fluid coupling between the air filter element 35 and the carburetor 26. In one embodiment, a clamp 68 can be provided to facilitate selective coupling of a collar 64 of the intake duct 30 to the first flanged end 58. The second flanged end 60 can be accessible from within the receptacle 50 such that, when the air filter element 35 is disposed within the receptacle 50, as illustrated in FIG. 4, the air filter element 35 can be coupled with the second flanged end 60. In one embodiment, a clamp 70 can be provided to facilitate selective coupling of a collar 66 of the air filter element 35 to the second flanged end 60, as shown in FIG. 7.

In one embodiment, the coupling 56 can be integrally formed with the air box 32 (e.g., the wall 46) such that the air box 32 and the coupling 56 are provided in a one-piece construction. However in other embodiments, the coupling 56 can be provided as a separate component and coupled with the air box 32 through the use of welding, releasable fasteners, or an interference-type fit, for example. It will be appreciated that an air duct and an air filter element can be fluidly coupled together in any of a variety of suitable alternative arrangements. It will also be appreciated that the air cleaner assembly can be provided in any of a variety of suitable alternative arrangements that facilitate introduction of ambient air into an engine.

As illustrated in FIG. 3, the body 42 of the air box 32 can include a lower rib member 71 that defines a rest surface 72. When the air filter element 35 is at least partially disposed within the receptacle 50, as illustrated in FIG. 4, the lower rib member 71 can provide underlying support for the air filter element 35. The lower rib member 71 is shown to extend from the floor 48 of the body 42 such that the lower rib member 71 is spaced from the wall 46. However, a lower rib member can be provided in any of a variety of other suitable arrangements. For example, a lower rib member can alternatively be coupled with a wall such that the lower rib member extends laterally and without contacting a floor of the air box 32.

In one embodiment, the lower rib member 71 and the body 42 can be separate components which can be secured together through welding, adhesives, or with releasable fasteners, for example. In another embodiment, however, the lower rib member 71 and the body 42 can be integrally formed together as a one-piece construction such as from plastic in an injection molding or other process. In such an embodiment, the lower rib member 71 can be coupled with the body 42 more effectively than through attachment of a lower rib member using fasteners or other attachment methods (e.g., adhesives or welding). For example, releasable fasteners that attach a lower rib member to a body can be time consuming and costly to implement and may be prone to loosening which can result in the lower rib member becoming inadvertently misaligned (e.g., during replacement of the air filter element 35). In addition, in such an embodiment, the lower rib member and the releasable fasteners can be prone are susceptible to misplacement during assembly and maintenance of the air cleaner assembly.

Figure 5:
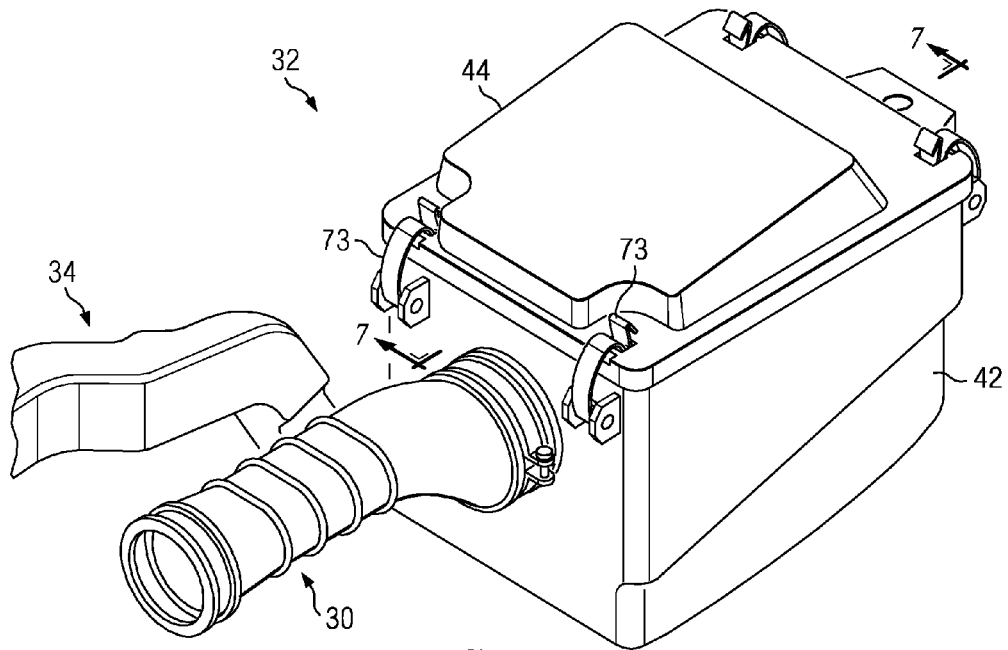
FIG. 5 is a top perspective view depicting the components of FIG. 4 as assembled.

As illustrated in FIGS. 4 and 5, the lid 44 can be movable between an opened position (FIG. 4) and a closed position (FIG. 5). When the lid 44 is in the opened position, the receptacle 50 can be accessible to facilitate removal and/or installation of the air filter element 35, for example. When the lid 44 is in the closed position, the receptacle 50 can be at least partially covered. In one embodiment, when the lid 44 is in the closed position, the lid 44 can completely cover the receptacle 50. In such an arrangement, the lid 44 can interact with the wall 46 to substantially seal the receptacle 50 and prevent air from escaping the receptacle 50 other than through the intake duct 30. In one embodiment, the lid 44 can include a sealing arrangement (e.g., 102 in FIG. 7) that selectively interacts with the wall 46 of the air box 32 to facilitate sealed engagement between the lid 44 and the wall 46. The sealing arrangement can include mating features of the lid 44 and the wall 46, and/or one or more gaskets or seals. The lid 44 can be releasably secured to the body 42 with retention clips 73, but can alternatively be releasably secured to the body 42 in any of a variety of suitable alternative arrangements, such as with threaded fasteners provided at the corners of a lid, for example. It will be appreciated that, although the lid 44 is shown to be completely removable from the body 42, a lid can be associated with a body of an air box in any of a variety of suitable alternative arrangements. For example, a lid can be hingedly coupled with a body of an air box.

Figure 6:
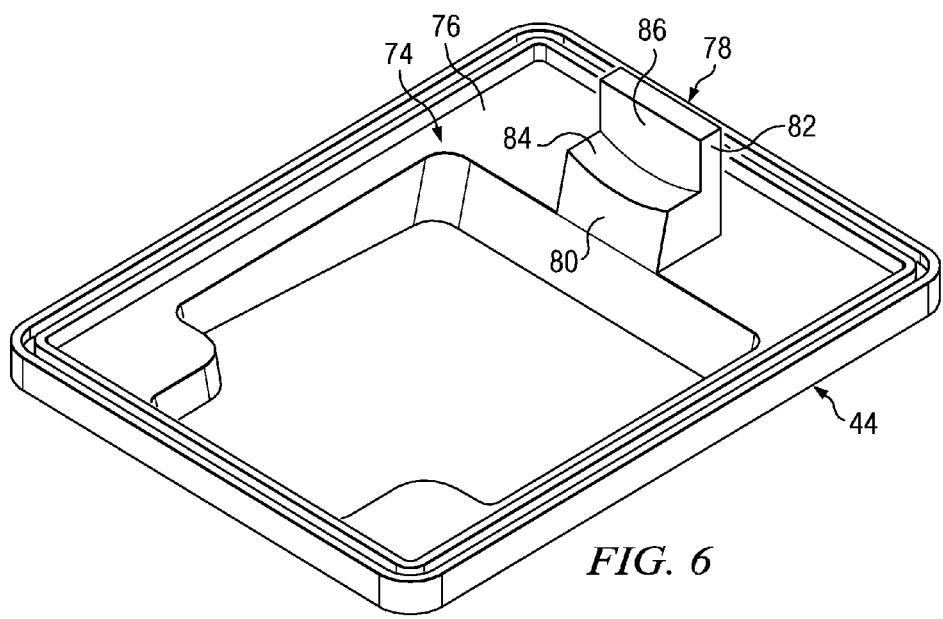
FIG. 6 is a bottom perspective view depicting the lid of the air cleaner assembly of FIG. 2.

As illustrated in FIG. 6, the lid 44 can include a cover member 74 that defines a lid surface 76. The lid 44 can also include an upper rib member 78 that can include a shoulder portion 80 and an arm portion 82. The arm portion 82 can extend from the shoulder portion 80 such that the upper rib member 78 is arranged in an L-shaped configuration. The shoulder portion 80 can define a shoulder surface 84 and the arm portion 82 can define an arm surface 86.

In one embodiment, the upper rib member 78 and the cover member 74 can be separate components which can be secured together through welding, or adhesives, or with releasable fasteners, for example. In another embodiment, however, the upper rib member 78 and the cover member 74 can be integrally formed together as a one-piece construction, as shown in FIG. 6. In such an embodiment, the upper rib member 78 can be coupled with the cover member 74 more effectively than through attachment of an upper rib member using fasteners, adhesives, or other attachment methods (e.g., welding). For example, releasable fasteners that attach an upper rib member to a cover member can be time consuming and costly to implement, and may be prone to loosening which can result in the upper rib member becoming misaligned (e.g., during placement of the lid 44 over the body 42 of the air box 32). In addition, the upper rib member and the releasable fasteners can be susceptible to misplacement during assembly and maintenance of the air cleaner assembly.

In one embodiment, as illustrated in FIGS. 3 and 7, the air filter element 35 can comprise a cylindrical, two-stage filter that extends between a first end 88 and a second end 90. The air filter element 35 can include an inner filter 96 and an outer filter 98. The outer filter 98 can comprise a cylindrical sleeve that can define an outer surface 92 and a corner 93. The inner filter 96 can define an end surface 94 which in one embodiment might be entirely defined by the inner filter 96 (e.g., the end surface is not defined by the outer filter 98). The inner filter 96 can include an inner collar 97 and the outer filter 98 can include an outer collar 99. The outer filter 98 can circumferentially surround the inner filter 96 and the inner collar 97 can rest against the outer collar 99. An interior annular ring 100 fowled on the outer collar 99 can engage the inner collar 97 to coupled the inner and outer collars 97, 99 together. As illustrated in FIG. 7, when the air filter element 35 is installed within the air box 32, the outer collar 99 can be inserted over the second flanged end 60 of the coupling 56 until the second flanged end 60 contacts the inner collar 97. The clamp 70 can be provided around the outer collar 99 and selectively tightened to facilitate coupling of the air filter element 35 to the coupling 56. In another embodiment, in lieu of a clamp, the collar 99 can be coupled with the second flanged end 60 through use of an interference-type arrangement.

When the lid 44 is provided in the closed position with the air filter element 35 at least partially disposed within the receptacle 50, the upper rib member 78 can engage the corner 93 of the air filter element 35. When the upper rib member 78 engages the corner 93, the shoulder and arm surfaces 84, 86 of the upper rib member 78 can contact the respective outer surface 92 and end surface 94 of the air filter element 35. The air filter element 35 can rest upon the lower rib member 71 such that the lower rib member 71 contacts the outer filter 98. When the lid 44 is in the closed position, as shown in FIG. 7, the lower and upper rib members 71, 78 can thus cooperate with one another to prevent movement of the air filter element 35 within the receptacle 50. For example, the first end 88 of the air filter element 35 can be sandwiched between the rest surface 72 of the lower rib member 71 and the shoulder surface 84 of the upper rib member 78. When the lid 44 is secured to the body 42 (e.g., with the retention clips 73), the lid 44 can impart a downward force on the air filter element 35 to compress the first end 88 of the air filter element 35 between the upper lower and upper rib members 71, 78 to prevent vertical movement of the air filter member 35. In this configuration, the arm portion 82 of the upper rib member 78 can contact the end surface 94 of the inner filter 96 to prevent lateral movement of the air filter member 35 away from the coupling 56, thereby reducing any risk that the air filter element 35 might become disconnected from the coupling 56 during operation of the vehicle 10.

In one embodiment, as illustrated in FIG. 6, the shoulder surface 84 of the upper rib member 78 can be contoured to correspond with the cylindrical shape of the outer filter 98 of the air filter element 35. Thus, in this configuration, when the air filter element 35 is sandwiched between the lower and upper rib members 71, 78, the shoulder portion 80 can be less prone to deforming the shape of the outer filter 98 of the air filter element 35. It will be appreciated that, although the lower and upper rib members 71, 78 are shown in FIG. 7 to contact the air filter element 35, in some embodiments the lower and upper rib members 71, 78 can indirectly bear against the air filter element 35 such as when an intermediate material is provided between the air filter element 35 and at least one of the lower or upper rib members 71, 78.

In one embodiment, the inner filter 96 can comprise a cardboard or metal, "flame-trap" type filter and the outer filter 98 can comprise an open-pore, flexible polyurethane foam sleeve. As illustrated in FIG. 7, the portion 82 of the upper rib member 78 can extend beyond the outer filter 98 to make contact with the inner filter 96 (e.g., the end surface 94). In such an embodiment, since the inner filter 96 might be more durable and/or rigid than the outer filter 98, the upper rib member 78 can be less prone to damaging the air filter element 35 than if the arm portion 82 only contacted the outer filter 98. In other embodiments, however, an air filter element can be provided in any of a variety of suitable alternative arrangements. For example, an air filter element can comprise a one-stage type filter that has an elongate, substantially rectangular shape.

The interaction between the upper rib member 78 and the air filter element 35 can ensure consistent and proper alignment of the air filter element 35 within the receptacle 50. For example, when the lid 44 is positioned over the body 42 of the air box 32, the upper rib member 78 can engage the corner 93 of the air filter element 35. When the lid 44 is aligned with respect to the body 42 (e.g., to facilitate attachment of the retention clips 73), the air filter element 35 can be positioned within the receptacle 50 by the upper rib member 78. In one embodiment, the upper rib member 78 can be arranged along the lid 44 such that moving the lid 44 into alignment with the body 42 pushes the air filter element 35 slightly forward (e.g., towards the coupling 56) to ensure that the air filter element 35 remains coupled with the coupling 56. In this configuration, the upper and lower rib members 71, 78 can cooperate to achieve consistent position of the air filter element 35 within the air box 32 each time the lid 44 is moved to the closed position. It will be appreciated that since the positioning of the upper and lower rib member 71, 78 can affect the positioning of the air filter element 35, the upper and lower rib member 71, 78 can be arranged to achieve any of a variety of positions of the air filter element 35 within the air box 32.

It will be appreciated that in one embodiment, the rest surface 72 of the lower rib member 71 can comprise a generally planar surface, as generally illustrated in FIG. 3, such that the lower rib member 71 is less prone to tearing the air filter element 35 when the air filter element 35 is moved within the receptacle 50. However, it will be appreciated that a rest surface of a lower rib member can be provided in any of a variety of suitable alternative configurations. For example, a rest surface of a lower rib member can be contoured to correspond with the cylindrical shape of the outer filter 98 of the air filter element 35 such that the arm portion can be less prone to deforming the shape of the outer filter 98 of the air filter element 35.

Figure 8:
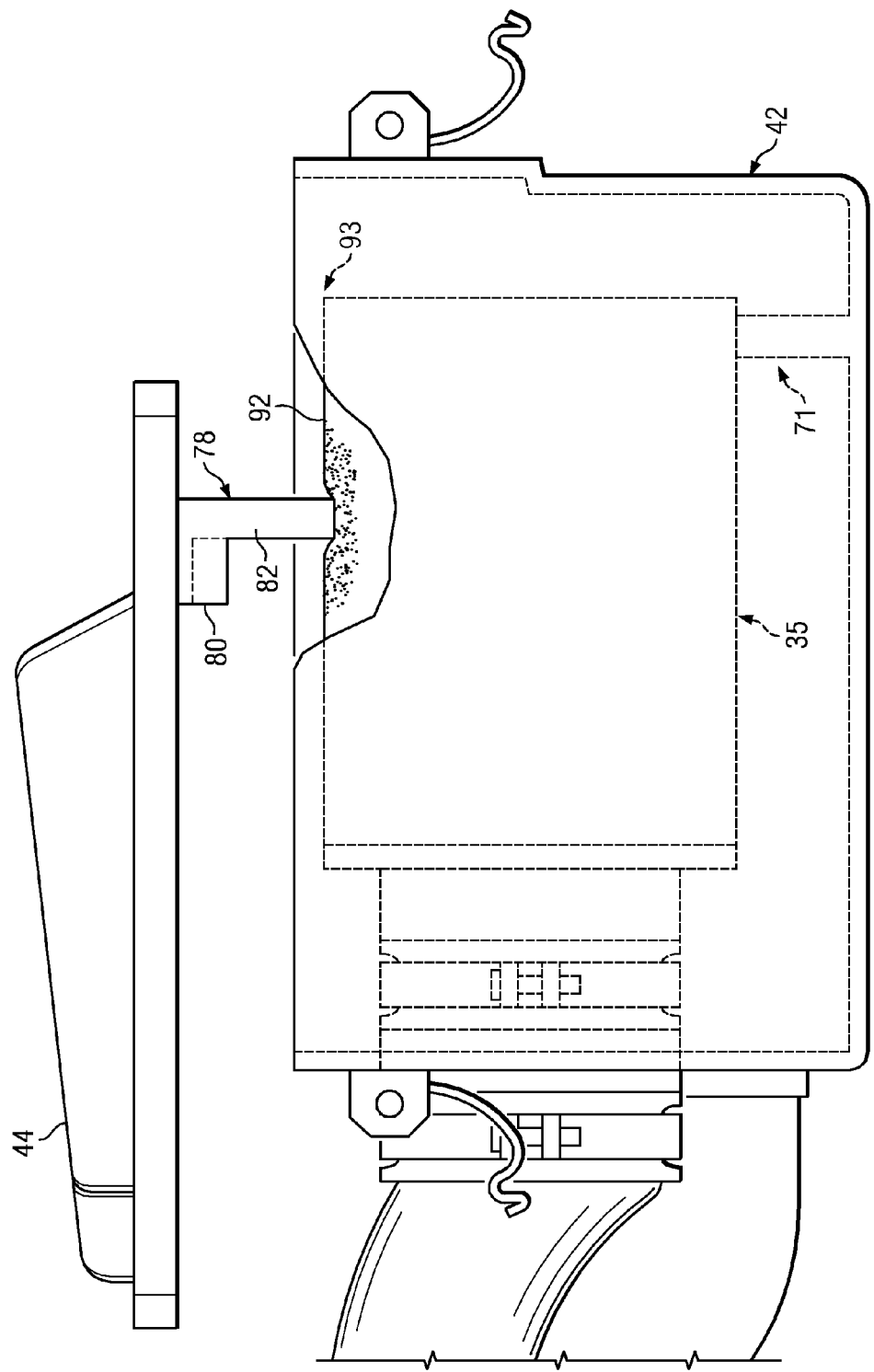
FIG. 8 is a side view depicting the air cleaner assembly of FIG. 5 with the lid in a partially closed position and contacting the air filter element.

The upper rib member 78 can also prevent the lid 44 from being incorrectly positioned over the body 42 with respect to the air filter element 35. For example, as illustrated in FIG. 8, if the upper rib member 78 is not properly aligned with the corner 93 of the air filter element 35, the arm portion 82 can contact the outer surface 92 of the air filter element 35 to prevent the lid 44 from moving into the closed position. The lid 44 is therefore less prone to being improperly installed upon the body 42 and thus less prone to damaging the upper rib member 78 and/or air filter member 35 when moved to the closed position.

It will be appreciated that during operation of the vehicle 10, ambient air (e.g., from the snorkel 34) can be circulated throughout the receptacle 50 and introduced into the air filter element 35. As illustrated in FIG. 7, the lower and upper rib members 71, 78 can support the first end 88 of the air filter member 35 such that the air filter element 35 is positioned between and spaced apart from the floor surface 49 and the lid surface 76. Ambient air can therefore pass to the air filter element 35 without obstruction from the floor surface 49 and the lid surface 76 and can thus effectively facilitate the flow of air into the air filter element 35 to allow efficient operation of the engine 12.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. An air cleaner assembly comprising:
   an air box comprising:
      a body comprising:
         a floor defining a floor surface;
         a wall extending from the floor and cooperating with the floor to at least partially define a receptacle; and
         a lower rib member defining a rest surface and coupled with at least one of the wall and the floor; and
      a lid associated with the body and movable between an opened position and a closed position, the lid comprising a cover member and an upper rib member, the upper rib member comprising a shoulder portion and an arm portion extending from the shoulder portion; and
   an air filter element at least partially disposed within the receptacle, the air filter element comprising a first end and a second end and defining an outer surface and a first end surface, the first end surface being adjacent to the first end of the air filter element; wherein:
   the cover member of the lid defines a lid surface;
   the shoulder portion of the upper rib member defines a shoulder surface;
   the arm portion of the upper rib member defines an arm surface; and
   when the lid is in the closed position, the lid at least partially covers the receptacle, the first end of the air filter element is sandwiched between the upper rib member and the lower rib member, the outer surface of the air filter element contacts each of the rest surface and the shoulder surface, the first end surface of the air filter element contacts the arm surface, and the air filter element is positioned between and spaced from each of the floor surface and the lid surface.

2. The air cleaner assembly of claim 1 wherein the air filter element further comprises an outer filter and an inner filter, the outer filter circumferentially surrounds the inner filter, the outer filter defines the outer surface, and the inner filter defines the first end surface.

3. The air cleaner assembly of claim 1 further comprising an air duct fluidly coupled with the second end of the air filter element and configured to facilitate fluid coupling with an engine.

4. The air cleaner assembly of claim 1 wherein the cover member and the upper rib member are provided in a one-piece construction.

5. The air cleaner assembly of claim 1 wherein the floor, the wall, and the lower rib member are provided in a one-piece construction.

6. The air cleaner assembly of claim 1 wherein the rest surface defined by the lower rib member is substantially planar.

7. The air cleaner assembly of claim 1 wherein, when the lid is in the closed position, the outer surface of the air filter element directly contacts each of the rest surface and the shoulder surface, and the first end surface of the air filter element directly contacts the arm surface.

8. The air cleaner assembly of claim 1 further comprising retention clips configured to releasably secure the lid to the body.

9. The air cleaner assembly of claim 1 wherein, when the lid is in the closed position, the lid is in sealed, mated engagement with the body.

10. A vehicle comprising:
a frame;
an engine supported with respect to the frame;
an air cleaner assembly supported with respect to the frame and comprising:
an air duct fluidly coupled with the engine;
an air box comprising:
a body comprising:
a floor defining a floor surface;
a wall extending from the floor and cooperating with the floor to at least partially define a receptacle; and
a lower rib member defining a rest surface and coupled with at least one of the wall and the floor; and
a lid associated with the body and movable between an opened position and a closed position, the lid comprising a cover member and an upper rib member, the upper rib member comprising a shoulder portion and an arm portion extending from the shoulder portion; and
an air filter element at least partially disposed within the receptacle and fluidly coupled with the air duct, the air filter element comprising a first end and a second end and defining an outer surface and a first end surface, the first end surface being adjacent to the first end of the air filter element; wherein:
the cover member of the lid defines a lid surface;
the shoulder portion of the upper rib member defines a shoulder surface;
the arm portion of the upper rib member defines an arm surface; and
when the lid is in the closed position, the lid at least partially covers the receptacle, the first end of the air filter element is sandwiched between the upper rib member and the lower rib member, the outer surface of the air filter element contacts each of the rest surface and the shoulder surface, the first end surface of the air filter element contacts the arm surface, and the air filter element is positioned between and spaced from each of the floor surface and the lid surface.

11. The vehicle of claim 10 wherein the air filter element further comprises an outer filter and an inner filter, the outer filter circumferentially surrounds the inner filter, and wherein the outer filter defines the outer surface and the inner filter defines the first end surface.

12. The vehicle of claim 10 wherein the cover member and the upper rib member are provided in a one-piece construction.

13. The vehicle of claim 10 wherein the floor, the wall, and the lower rib member are provided in a one-piece construction.

14. The vehicle of claim 13 wherein the lower rib member is coupled with the floor and is spaced from the wall.

15. The vehicle of claim 10 wherein the shoulder surface is contoured to correspond with the outer surface of the air filter element.

16. The vehicle of claim 10 wherein, when the lid is in the closed position, the outer surface of the air filter element directly contacts each of the rest surface and the shoulder surface, and the first end surface of the air filter element directly contacts the arm surface.

17. The vehicle of claim 10 wherein the air cleaner assembly further comprises retention clips configured to releasably secure the lid to the body.

18. The vehicle of claim 10 wherein, when the lid is in the closed position, the lid is in sealed, mated engagement with the body.

19. An air cleaner assembly comprising:
an air box comprising:
a body comprising:
a floor defining a floor surface;
a wall extending from the floor and cooperating with the floor to at least partially define a receptacle, the wall defining a passageway; and
a lower rib member defining a rest surface and coupled with at least one of the wall and the floor; and
a lid associated with the body and movable between an opened position and a closed position, the lid comprising a cover member and an upper rib member, the upper rib member comprising a shoulder portion and an arm portion extending from the shoulder portion; and
an air filter element at least partially disposed within the receptacle and comprising a first end and a second end, the air filter element comprising an inner filter and an outer filter, the inner filter defining a first end surface and the outer filter defining a substantially cylindrical outer surface, the first end surface being adjacent to the first end of the air filter element and the second end being in fluid communication with the passageway; wherein:
the cover member of the lid defines a lid surface;
the shoulder portion of the upper rib member defines a shoulder surface;
the arm portion of the upper rib member defines an arm surface; and
when the lid is in the closed position, the lid at least partially covers the receptacle, the first end of the air filter element is sandwiched between the upper rib member and the lower rib member, the substantially cylindrical outer surface of the outer filter contacts each of the rest surface and the shoulder surface, the arm portion of the upper rib member extends beyond the outer filter such that the arm surface contacts the first end surface of the inner filter, and the outer surface of the outer filter is completely spaced from the floor surface and the lid surface.

20. The air cleaner assembly of claim 19 wherein the shoulder surface is contoured to correspond with the substantially cylindrical outer surface of the air filter element.

21. An air cleaner assembly comprising:
    an air box comprising:
        a receptacle; and
        a lid movable with respect to the receptacle between an opened position and a closed position, the lid comprising an upper rib member; and
    an air filter element removably disposed within the receptacle, the air filter element comprising an outer filter and an inner filter, the inner filter being more rigid than the outer filter; wherein:
    when the lid is in the closed position, the lid at least partially covers the receptacle, and the upper rib extends beyond the outer filter to make contact with the inner filter.

* * * * *

UNITED STATES PATENT AND TRADEMARK OFFICE
CERTIFICATE OF CORRECTION

PATENT NO. : 8,337,579 B2
APPLICATION NO. : 12/942065
DATED : December 25, 2012
INVENTOR(S) : Alexander et al.

It is certified that error appears in the above-identified patent and that said Letters Patent is hereby corrected as shown below:

Column 1, line 45, change "aim" to --arm--;
Column 2, line 33, change "aim" to --arm--;
Column 6, line 20, change "fowled" to --formed--; and
Column 7, line 10, change "the portion" to --the arm portion--.

Signed and Sealed this
Nineteenth Day of March, 2013

Teresa Stanek Rea
*Acting Director of the United States Patent and Trademark Office*